(12) United States Patent
Cudney et al.

(10) Patent No.: US 7,007,356 B2
(45) Date of Patent: Mar. 7, 2006

(54) CUSHIONING PADS AND THE FORMATION OF CUSHIONING PADS

(75) Inventors: Douglas J. Cudney, Orangeville (CA); Karen Breitbach, Orangeville (CA)

(73) Assignee: Phoenix Performance Products, Inc., Orangeville (CA)

( * ) Notice: Subject to any disclaimer, the term of this patent is extended or adjusted under 35 U.S.C. 154(b) by 301 days.

(21) Appl. No.: 10/665,601

(22) Filed: Sep. 22, 2003

(65) Prior Publication Data

US 2004/0129379 A1    Jul. 8, 2004

Related U.S. Application Data

(63) Continuation of application No. 09/335,897, filed on Jun. 18, 1999, now abandoned.

(51) Int. Cl.
  *B68G 7/00* (2006.01)
  *B32B 31/20* (2006.01)

(52) U.S. Cl. .......... 29/91.1; 29/430; 156/290; 156/291; 156/292; 156/212; 156/213; 5/706; 5/709; 428/68; 428/71; 428/76

(58) Field of Classification Search .......... 29/430, 29/91.1; 156/212, 213, 290, 291, 292; 428/68, 428/71, 76; 5/706, 709
See application file for complete search history.

(56) References Cited

U.S. PATENT DOCUMENTS

| 3,872,525 A | 3/1975 | Lea et al. |
| 4,025,974 A | 5/1977 | Lea et al. |
| 6,190,486 B1 | 2/2001 | Switlik |

OTHER PUBLICATIONS

Sales Brochure entitled, Air-Ride Saddle Pad, Tipperary Manufacturing, Inc.
Sales Brochure entitled, Ultra Air-Ride Saddle Pad, Phoenix Performance Products.

*Primary Examiner*—David P. Bryant
(74) *Attorney, Agent, or Firm*—Birch, Stewart, Kolasch & Birch, LLP

(57) ABSTRACT

A method of forming a cushioning pad includes placing a component formed of polyurethane foam onto a first web of polyethylene foam. A second web of polyethylene foam is then placed over the component to sandwich the component. Heat and pressure is applied to the sandwich, which flattens the component and forms a seam between the first web and the second web encircling the component. If an unsealed cushioning pad is to be formed, a hollow needle is inserted into one of the first web or the second web. Air passes through the hollow needle and into the component, which absorbs the air and expands. Later, the needle is removed. If a sealed cushioning pad is to be formed, an insertion point of the hollow needle is in the seam, between the first web and the second web. After the component absorbs air and expands, the needle is removed and the insertion point of the hollow needle is re-seamed.

15 Claims, 6 Drawing Sheets

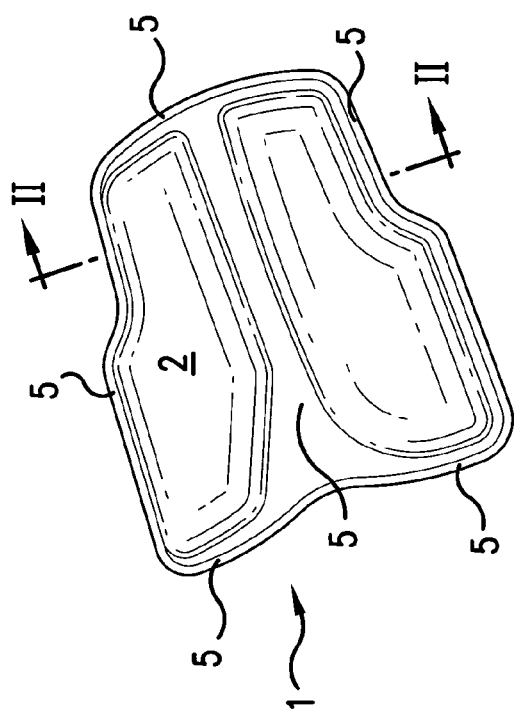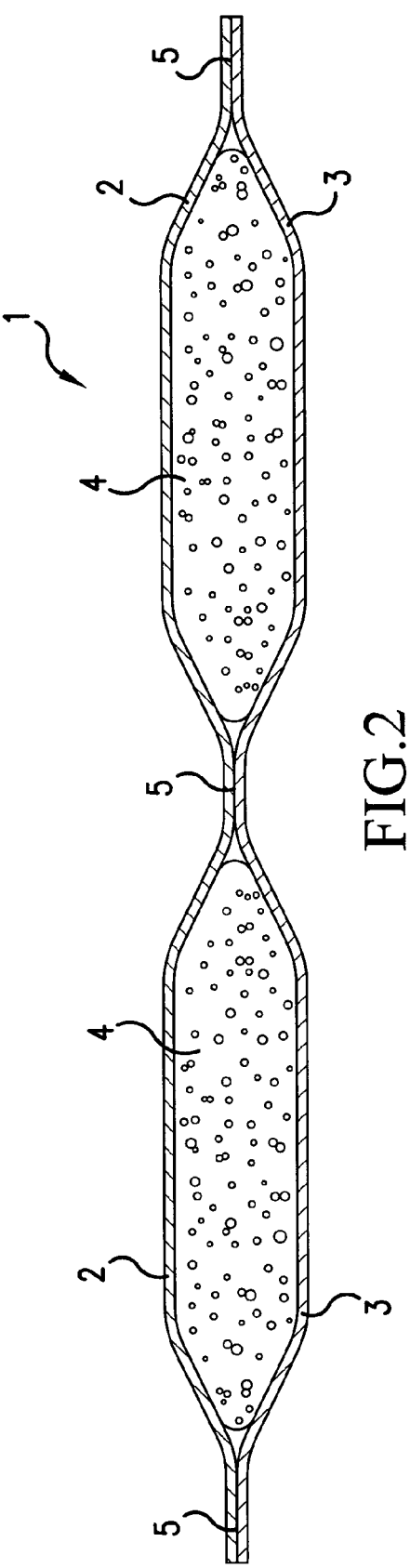
FIG.1
FIG.2

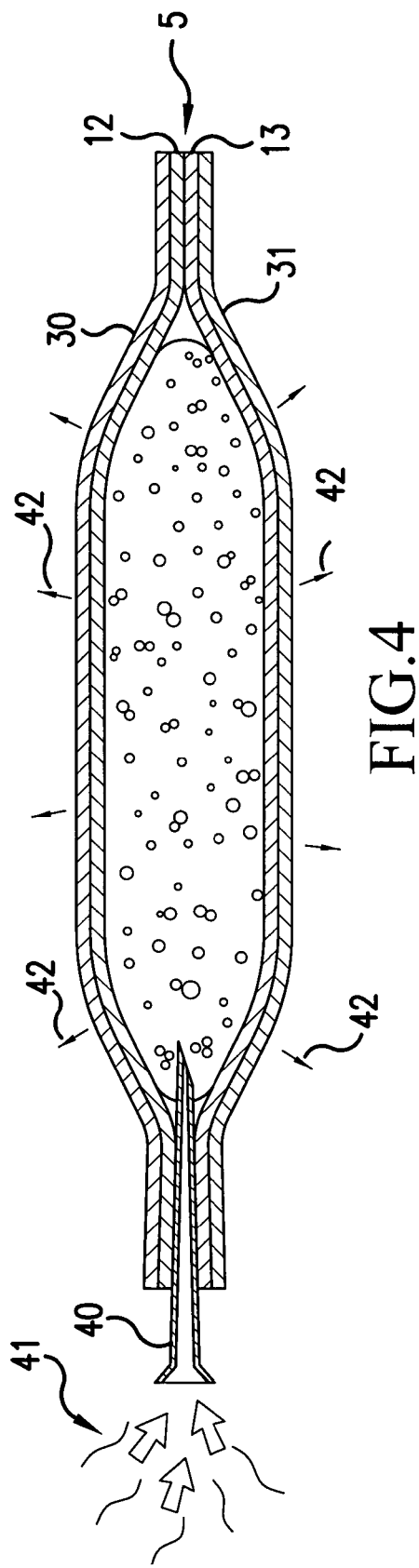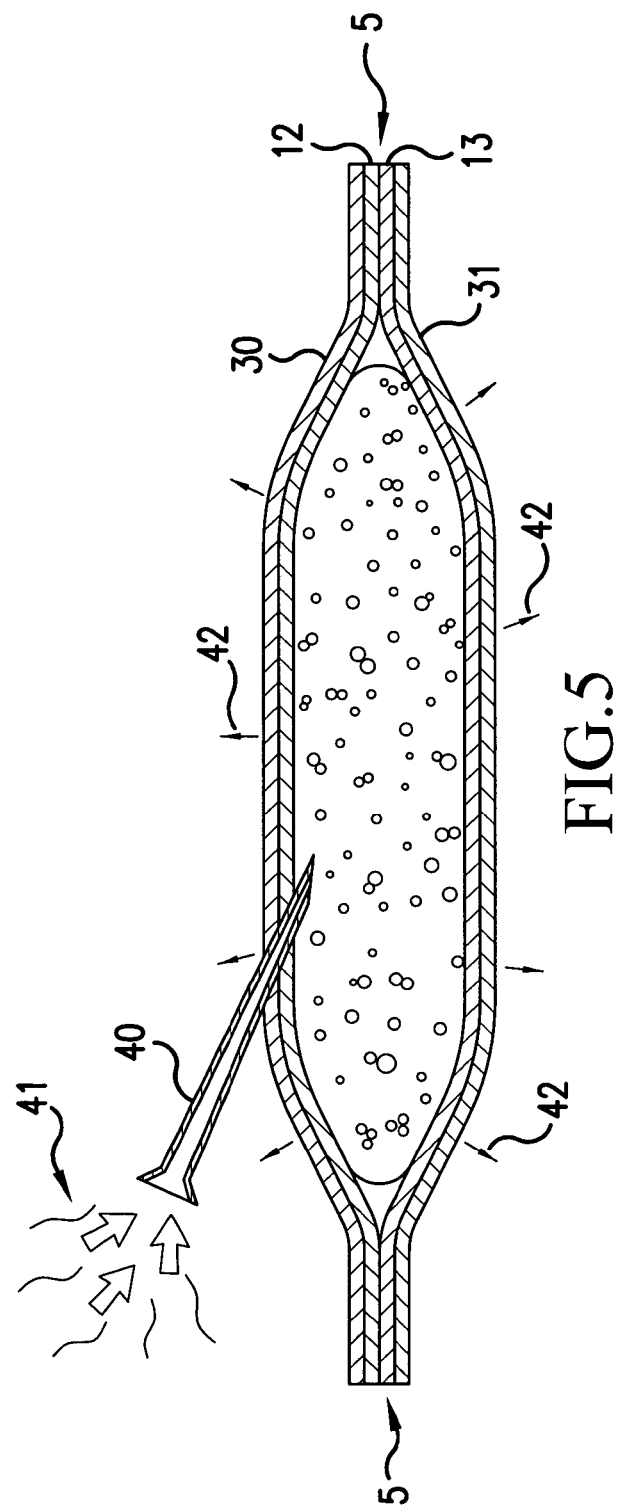

CUSHIONING PADS AND THE FORMATION OF CUSHIONING PADS

This is a continuation of application Ser. No. 09/335,987, filed Jun. 18, 1999, now abandoned, the entire contents of which are hereby incorporated by reference.

BACKGROUND OF THE INVENTION

1. Field of the Invention

The present invention relates to a method of forming a cushioning pad, and several cushioning pads produced by the method.

2. Description of the Related Art

Cushioning pads, or impact absorbing pads, are well known in the existing art. Impact absorbing pads are used to improve the comfort and ergonomics of many items which interact with humans and animals. Also, impact absorbing pads are useful in dampening vibrations and deadening sound between interacting objects. Typical applications for these pads include sporting gear apparel, seat covers, and shoe insoles and linings.

Typical impact absorbing pads are constructed of a resilient layer of an open-air material, such as foam or polyurethane. The resilient layer is porous and naturally holds air therein. Upon an impact the resilient layer will compress at and adjacent to a point of the impact, as the air therein is removed from the material.

Such open-air material constructions of impact absorbing pads suffer drawbacks. One drawback is that the impact absorption ability of the pad is directly related to its thickness. Often, it is desirable to keep the thickness of the pad to a minimum, such as with shoe insoles, and seat cushions. On the other hand, if the resilient layer is made too thin, the impact absorbing pad will offer insufficient cushioning.

Another drawback is that an uncovered, resilient layer tends to be slow in re-adopting its original shape after being compressed. This is not acceptable in applications like sporting gear. In some sports, the wearer of the impact absorbing pad may be subjected to multiple impacts in quick succession. If the impact absorbing pad is still compressed, or only beginning to re-adopt its original shape, when a next succeeding impact occurs, the wearer of the impact absorbing pad may suffer injury due to insufficient impact absorption. Therefore, these well-known open-air types of impact absorbing pads are unsuitable as protective gear in sports.

Another known type of impact absorbing pad is an encapsulated pad. Encapsulated pads offer a partial solution to the drawbacks of open-air material type cushioning pads. One such product is known as a gel pack, and has enjoyed success in environments such as shoe insoles and bicycle seats.

A gel pack has a liquid or plasma-like material contained within a flexible housing. Due to its sealed encapsulation, an impact upon the gel pack creates a pressure inside the housing. The pressure acts to more quickly restore the gel pack to its original shape after the impact.

Gel-packs also suffer drawbacks. The relatively denser gel does not offer the comfort associated with the air cushioning of an open-air material. This may be due to the observation that the denser gel transfers a larger percentage of an impact to the user. Also, gel-packs are constructed of relatively more heavy and expensive materials.

To this end, a cushion, which encapsulates an air filled resilient member, has been developed. The air filled resilient member offers the comfort level of an open-air material, yet, due to its encapsulation, can regain its original shape more quickly after an impact.

The present inventor has developed a horse saddle cushion having an encapsulated air-filled resilient member. The horse saddle cushion is the subject of U.S. Design Patent 350,420. While the product has enjoyed great success in the marketplace, the inventor has maintained as secret, the method of manufacturing the horse saddle cushion. The method is the key to forming a superior performing cushioning pad, whether the cushioning pad be applied as a horse saddle pad or in any other environment.

Others in the art have tried to manufacture a comparable cushioning pad, having an encapsulated air-filled resilient member. No one, to the knowledge of the inventor, has succeeded to produce such a cushioning pad having the superior performance of the inventor's cushioning pad. The failure has been attributed to the lack of knowledge of the inventor's method of production. To this end, the art could benefit from a disclosure of a method of forming a cushioning pad having an encapsulated air-filled resilient member.

SUMMARY OF THE INVENTION

It is an object of the present invention to provide an efficient and inexpensive method of making a comfortable cushioning pad.

Moreover, it is an object of the present invention to provide several cushioning pads constructed in accordance with the method of the present invention.

These and other objects of the present invention are fulfilled by a method of forming a cushioning pad comprising the steps of: providing a first web of a first material; a second web of a second material; and a component of a third material; placing the component on the first web; attaching the second web to the first web to form a seam surrounding the component, thereby encapsulating the component; forming an opening in at least one of the first web, the second web, or in a seam between the first web and the second web, which opening passes to the component; and allowing air to pass through the opening into the component.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein:

FIG. 1 is a perspective view of a sealed impact absorbing pad, produced by a method in accordance with the present invention;

FIG. 2 is a cross sectional view taken along line II—II of FIG. 1;

FIG. 4 is a cross sectional view illustrating an aeration phase of the method when producing a sealed impact absorbing pad;

FIG. 5 is a cross sectional view illustrating an aeration phase of the method when producing an unsealed impact absorbing pad;

DETAILED DESCRIPTION OF THE INVENTION

Figure 3:
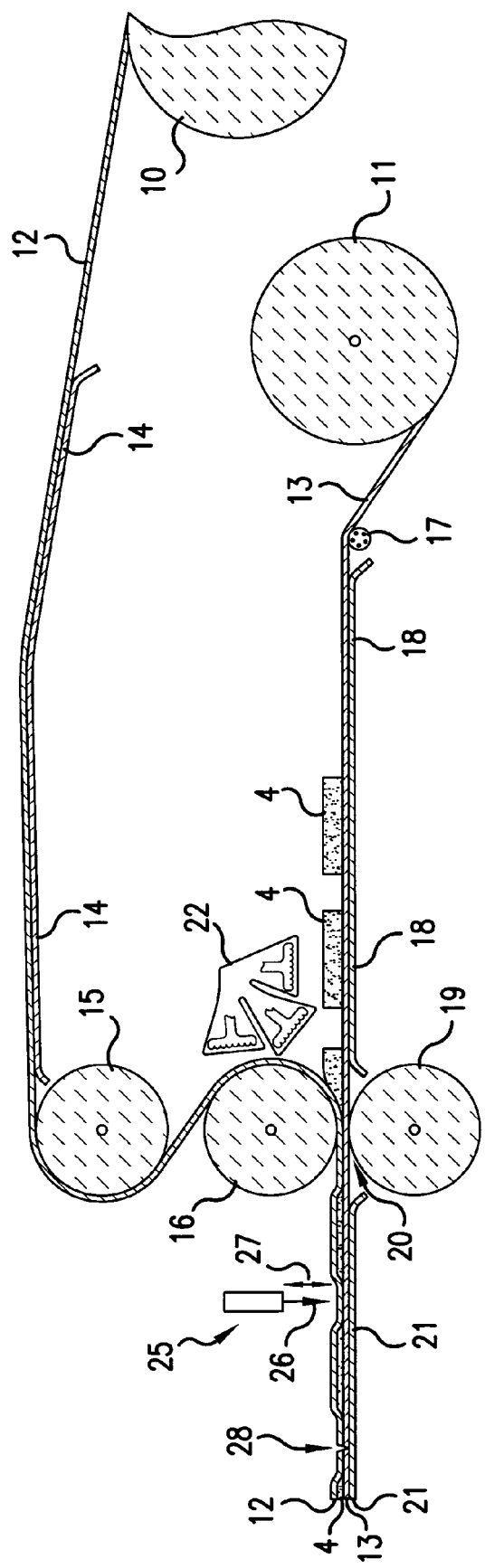
FIG. 3 is side view illustrating a seaming phase of the method in accordance with the present invention.

FIGS. 1 and 2 illustrate a pad 1 constructed by a method in accordance with the present invention. The pad 1 includes a first layer 2 of a first material and a second layer 3 of a second material. The first layer 2 is attached to the second layer 3 at seamed sections 5 to encapsulate one or more components 4.

The first and second materials are preferably a flexible resilient material which has a low permeability to air, such as a closed-cell foam, like polyethylene foam. The third material is preferably a flexible resilient material which can absorb and release air, such as an open-celled, foam like polyurethane foam. Such open-cell foam typically contains approximately 80% air by volume when in an uncompressed state.

FIG. 3 is a cross sectional view illustrating an apparatus for, and a method of, forming the pad 1 of FIGS. 1 and 2. The apparatus includes a first feeding spool 10 having a first web 12 of material wound thereon and a second feeding spool 11 with a second web 13 of material wound thereon. The apparatus also includes a first guide 14, a second guide 18, a third guide 21, a first roller 15, a second roller 16, a third roller 17, a fourth roller 19, and a heating unit 22.

The first web 12 is unwound from the first feeding spool 10 and passes over the first guide 14. Next, the first web 12 passes over the first roller 15 and the second roller 16. The second web 13 is unwound from the second feeding spool 11 and passed over the third roller 17 and the second guide 18. Next, the second web 13 passes over the fourth roller 19.

The second roller 16 and the fourth roller 19 define a limited area 20 there between. Both the first web 12 and the second web 13 must pass through the limited area 20. One or more of the rollers 15, 16, 17, 19 are power driven so that the first web 12 and the second web 13 are delivered from the first feeding spool 10 and the second feeding spool 11, respectively, and pass through the limited area 20 at substantially the same rate. Further, one or both of the first feeding spool 10 and the second feeding spool 11 may be power driven to assist in the paying out of the first web 12 and the second web 13.

As the second web 13 passes along on the second guide 18, the components 4 are placed thereon. The placing may occur by hand, or more preferably, by an automated machine. As the second web 13 passes under the heating unit 22, both the component 4 and the second web 13 are heated. Simultaneously, the first web 12 passes adjacent to the heating unit 22 as it winds over the second roller 16 and the first web 12 is heated.

In the limited area 20, the component 4 is compressed between the first web 12 and the second web 13. The compression of the component 14 causes the component 14 to spread laterally, or pancake out. The component 14 does not spread laterally to the extent that it overlaps any edge of the first web 12 or the second web 13.

During the compression, the first web 12 and second web 13 contact with one another to encircle the component 4. Due to the heat generated by the heating unit 22 and the pressure exerted upon the webs 12, 13 as they pass through the limited area 20, the first web 12 is bonded to the second web 13 at the encirclement of the component 4. After the bonding of the first web 12 to the second web 13, causing the encapsulation of the component 4, the combination passes along on the third guide 21. The combination will retain its compressed configuration due to the inability of air to pass through the material of the first and second webs 12, 13.

A cutting machine 25 is located downstream of the limited area 20. The cutting machine 25 includes a blade 26 above the third guide 21. The blade 26 reciprocates in the directions of the double-headed arrow 27, and is timed to produce cuts 28 between select ones of the encapsulated components 4. Alternatively, a service person may cut between select ones of the components 4.

FIGS. 4 and 5 illustrate the cushioning pads 1 removed from the third guide 21 during an aeration phase of the method, as will be described later. It should be noted in FIGS. 4 and 5 that a first additional layer 30 has been added to the first web 12 and a second additional layer 31 has been added to the second web 13. The additional layers 30, 31 could be added after the seaming phase of the method illustrated in FIG. 3, or the additional layers could be pre-attached to the first and second webs 12, 13 wound on the first and second feeding spools 10, 11, or the additional layers 30, 31 could be fed from additional feeding spools (not shown) and attached to the first and second webs 12, 13 at the limited area 20.

The first additional layer 30 is preferably constructed of a soft material, such as fabric, and adapts the cushioning pad for contacting a person, an animal, or delicate object. The second additional layer 31 is preferably constructed of a tacky and/or wear resistant material, such as vinyl, and adapts the cushioning pad for direct contact to a rough, inanimate object. Of course, other materials may be used for the additional layers 30, 31, to suit the application of the cushioning pad, or no additional layers 30, 31 need by included if the application does not call for them.

As mentioned above, FIGS. 4 and 5 also illustrate the cushioning pad during the aeration phase of the method. FIGS. 4 and 5 illustrate alternative methods of aerating the cushioning pads. Both methods involve a hollow needle 40. The method of FIG. 4 is used to produce a sealed cushioning pad, whereas the method of FIG. 5 is used to produce an unsealed cushioning pad.

In FIG. 4, the needle 40 is inserted between the first web 12 and the second web 13 to dislodge the seam 5 at the insertion point. The needle 40 is inserted through the seam 5 and up to, or into, the component 4. By piercing the seam 5, the needle 40 breaks the airtight barrier, encapsulating the component 4. Now, the component 4, due to its own natural resilience, will tend to reassume its uncompressed state. Since the needle 40 is hollow, air 41 will be drawn into the component 4, as the component 4 expands, as indicated by the arrows 42.

After a period of time has elapsed, the component 4 will absorb a predetermined quantity of air and cease to expand. Alternatively, the predetermined quantity of air can be injected, via the needle 40, into the component 4 to expand it. After the component 4 has expanded, the needle 40 is removed. Next, the insertion point of the needle 40 is closed by re-seaming the first web 12 to the second web 13. The re-seaming can be accomplished by application of a soldering iron, or other heating instrument, to the needle insertion point while pressing the first and second webs 12, 13 together. The resulting cushioning pad 1 is a sealed cushioning pad.

FIG. 5 illustrates the aeration phase of an unsealed cushioning pad. The needle 40 is inserted through the first web 12, and up to, or into, the component 4. Again, the component 4 will expand in the directions of arrows 42 and draw air 41 in through the needle 40. It should be noted that the needle 40 could just as well have been inserted through the second web 13.

After the component 4 has finished expanding, or a predetermined quantity of air has been injected into the component 4, or even prior to this time, the needle 40 is removed. An opening remains in the fist web 12 at the insertion point of the needle 40. Therefore, when the cushioning pad 1 is impacted or subjected to a compression force during use, the air filled component 4 will be able to release air through the opening at a slow rate. Later, after the removal of the impact or compression force, the component 4 will also be able to draw air in through the opening at a slow rate as it expands in the direction of the arrows 42.

Figure 6:
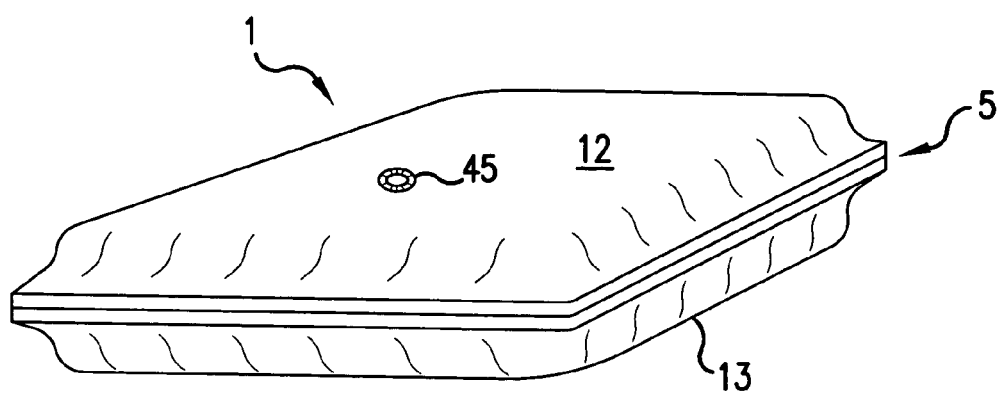
FIG. 6 is a perspective view of the cushioning pad after the aeration step illustrated in FIG. 5, and after the installation of a grommet.

FIG. 6 is a perspective view of the cushioning pad 1 of FIG. 5 after removal of the needle 40. It should be noted that a grommet 45 has been installed about the opening formed by the needle 40. The grommet 45 is a convenient way to ensure that the opening will not tear and enlarge upon an impact to the cushioning pad 1. Also, various diameters of grommets 45 can be selected by the manufacturer to select the size of the opening. Selecting the size of the opening influences the rate that air can pass into and out of the component 4, and therefore can be beneficial in tuning the cushioning pad 1 to a particular end use.

Figure 7:
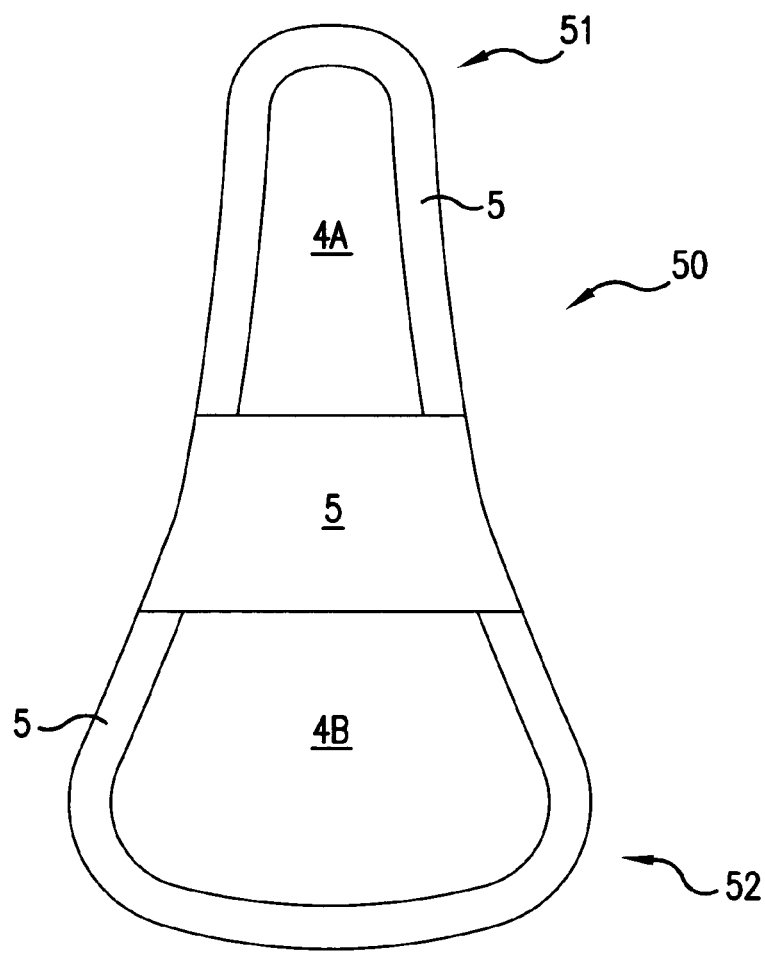
FIG. 7 is a front view of a cushioning pad configured as a sternum and heart protector.
Figure 8:
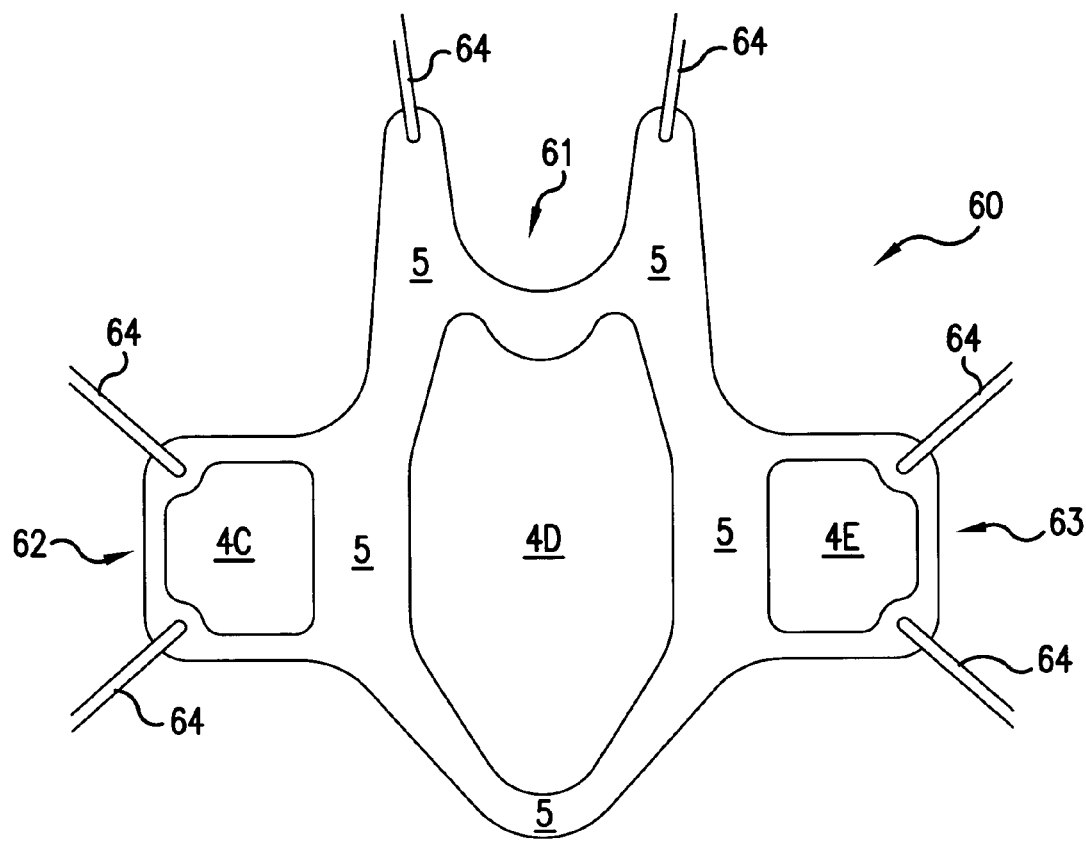
FIG. 8 is a front view of a cushioning pad configured as a sparring vest.
Figure 9:
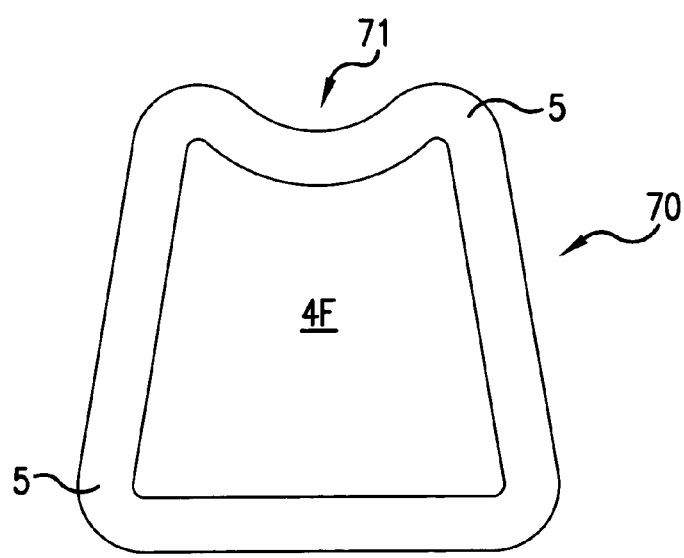
FIG. 9 is a front view of a cushioning pad configured as a shoe tongue.

FIGS. 7, 8, and 9 illustrate a sporting apparel member which includes a cushioning pad formed by the method of the present invention. Cushioning pads are of particular importance in the sporting art, since many sports (e.g. karate, football, hockey, rugby, soccer) involve physical contact between other players or objects such as balls, goals post, and the ground. Cushioning pads, constructed in accordance with the present invention, offer superior protection during the play of these sports and can reduce the likelihood of bruises, broken bones, and other injuries.

FIG. 7 illustrates a sternum and heart protector 50. Reference numeral 51 indicates an upper portion of the protector 50 which would overlay the breast plate of the wearer, whereas reference numeral 52 indicates a lower portion of the protector 50 which would overlay the sternum of the wearer. It can be seen in FIG. 7 that an upper component 4A in the upper portion 51 is differently shaped as compared to a lower component 4B in the lower portion 52. Seams 5 completely encircle the upper and lower components 4A, 4B.

FIG. 8 illustrates a vest 60 for use in aggressive sports, such as karate. Reference numeral 61 indicates a portion of the vest 60 which abuts the neck of the wearer. Reference numeral 62 indicates a portion of the vest which overlays the right side of the wearer, whereas reference numeral 63 indicates a portion of the vest 60 which overlays a left side of the wearer. The vest 60 is worn by tying straps 64 around the wearer. The vest 60 includes a right side component 4C, a middle component 4D, and a left side component 4E. Again the components 4C, 4D, 4E are encircled by seams 5.

FIG. 9 illustrates a shoe tongue cushion 70 for use as, or in combination with, a tongue of a shoe. The shoe tongue cushion 70 is particularly advantageous in such sporting shoes as roller skates, ice skates, and ski boots. Reference numeral 71 indicates a cut out in an upper portion of the shoe tongue cushion 70 for facing toward the wearer's ankle. The shoe tongue cushion 70 includes a single component 4F.

Figure 10:
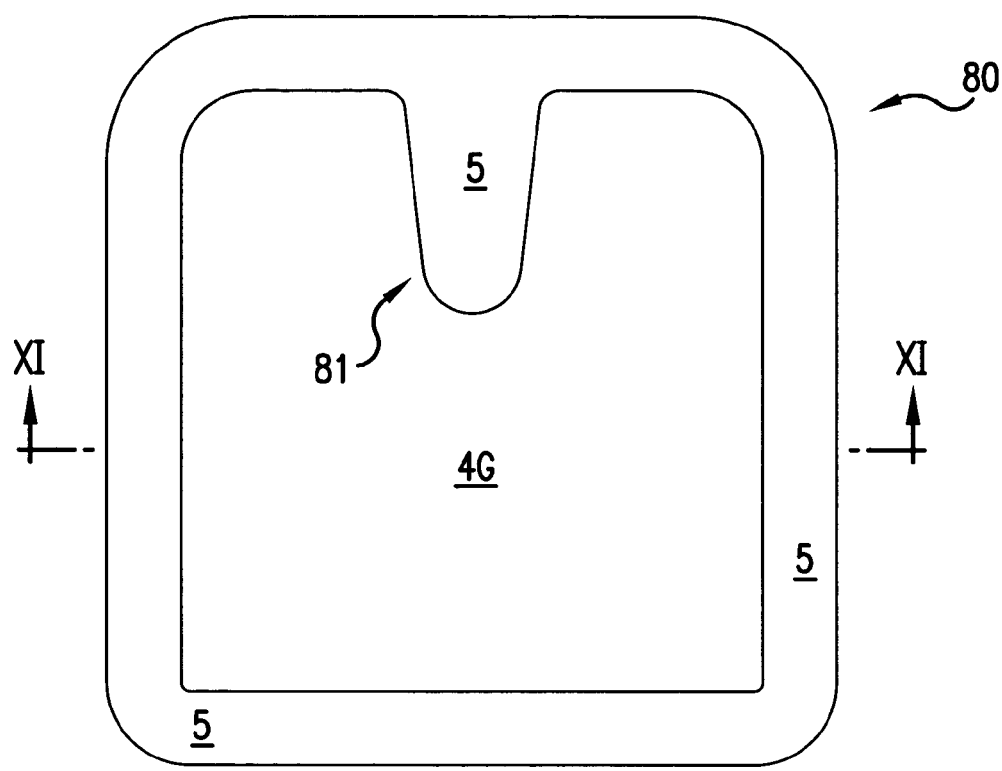
FIG. 10 is a plan view of a cushioning pad configured as a seat cushion.
Figure 11:
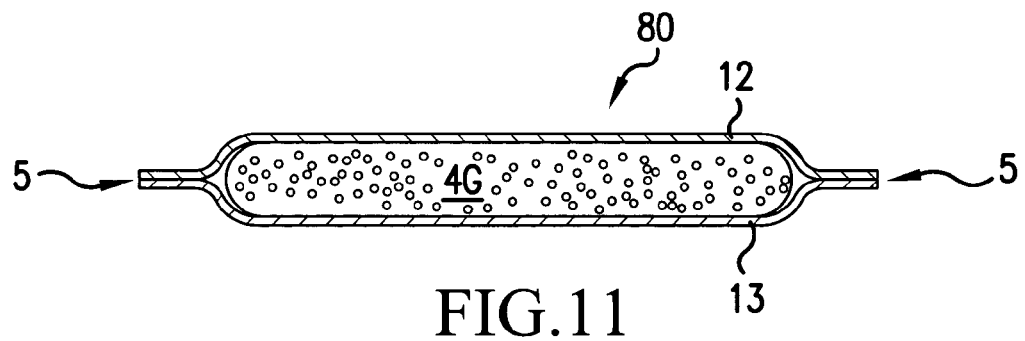
FIG. 11 is cross sectional view taken along line XI—XI of FIG. 10.

FIGS. 10 and 11 illustrate a seat cushion 80. The seat cushion could be used as a temporary overlay to a hard chair, or could be permanently attached to a chair. The seat cushion 80 includes a single component 4G. Reference numeral 81 indicates a notch formed in the component 4G which is straddled when a user sits on the seat cushion 80. FIG. 11 illustrates the encapsulation of the component 4G inside the first and second webs 12, 13.

A cushion, or impact absorbing member, constructed in accordance with the present invention, offers many superior advantages over conventional cushioning devices. A cushioning device, constructed in accordance with the present invention, disperses impacts evenly to objects attached thereto, and it offers a more comfortable and ergonomic feel when physically contacted.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A method of forming a cushioning pad comprising the steps of:
   providing a first web of a first material; a second web of a second material; and a component of a third material;
   placing the component on the first web;
   covering the component with the second web;
   compressing the component to a substantially flattened state between the first web and the second web, as the first web, the component and the second web simultaneously pass through a gap formed between a pair of pressing members;
   attaching the second web to the first web to form a seam completely surrounding the component, thereby encapsulating the component, as the first web, the component and the second web simultaneously pass through the gap formed between the pair of pressing members;
   forming an opening in at least one of the first web, the second web, or in a seam between the first web and the second web, which opening passes to the component; and
   allowing air to pass through the opening into the component, such that the component expands in size from its substantially flattened state.

2. The method according to claim 1, further comprising the step of:
   heating the first web and the second web during said attaching step.

3. The method according to claim 1, further comprising:
   applying an adhesive to at least one of the first web and the second web during said attaching step.

4. The method according to claim 1, wherein said allowing step includes injecting air into the component.

5. The method according to claim 1, wherein said forming step includes forming the opening in the seam between the first web and the seam, said method further comprising the step of:
   re-attaching the first web to the second web to close the opening after said allowing step.

6. The method according to claim 1, further comprising the step of:
   installing a grommet around a perimeter of the opening.

7. The method according to claim 1, wherein the third material is polyurethane.

8. The method according to claim 1, wherein the first material is the same as the second material.

9. The method according to claim 1, wherein the first material and the second material are polyethylene foam.

10. The method according to claim 1, wherein at least one of the first material and the second material includes a layer of vinyl.

11. The method according to claim 1, wherein at least one of the first material and the second material includes a layer of fabric.

12. The method according to claim 1, wherein the first material includes a layer of polyethylene foam and the second material includes a layer of polyethylene foam, and wherein at least one of the first material and the second material also includes a layer of vinyl.

13. The method according to claim 1, wherein the first material includes a layer of polyethylene foam and the second material includes a layer of polyethylene foam, and wherein at least one of the first material and the second material also includes a layer of fabric.

14. The method according to claim 1, further comprising the step of:
   cutting along at least a portion of the seam surrounding the component to size the pad.

15. The method according to claim 1, wherein the pressing members are rollers.

* * * * *